United States Patent
Hsu et al.

(10) Patent No.: US 11,524,595 B2
(45) Date of Patent: Dec. 13, 2022

(54) ELECTRIC TRANSPORT DEVICE CHARGING AND CLEANING STATION

(71) Applicant: Honda Motor Co., Ltd., Tokyo (JP)

(72) Inventors: Ricky Jukuei Hsu, Rancho Palos Verdes, CA (US); Can Bulat, Oregon, OH (US); Mason Watson, Los Angeles, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 372 days.

(21) Appl. No.: 16/797,741

(22) Filed: Feb. 21, 2020

(65) Prior Publication Data

US 2021/0261099 A1    Aug. 26, 2021

(51) Int. Cl.
| | | |
|---|---|---|
| *B60L 53/35* | (2019.01) | |
| *B60S 3/04* | (2006.01) | |
| *B60L 53/60* | (2019.01) | |

(52) U.S. Cl.
CPC .............. *B60L 53/35* (2019.02); *B60L 53/60* (2019.02); *B60S 3/041* (2013.01)

(58) Field of Classification Search
CPC ....................................................... B60L 53/35
USPC ........................................................ 180/220
See application file for complete search history.

(56) References Cited

U.S. PATENT DOCUMENTS

| | | | | |
|---|---|---|---|---|
| 5,812,070 A * | 9/1998 | Tagami | ................... | G07B 15/00 701/29.6 |
| 6,850,898 B1 * | 2/2005 | Murakami | ............ | B60L 53/305 705/13 |
| 7,271,701 B2 * | 9/2007 | Kokubu | ................. | G06Q 50/06 340/5.1 |
| 2010/0228405 A1 * | 9/2010 | Morgal | ................... | B60L 50/20 701/1 |
| 2010/0280700 A1 * | 11/2010 | Morgal | ................. | G06Q 10/02 705/5 |
| 2011/0140658 A1 * | 6/2011 | Outwater | ............... | B60L 53/35 320/109 |
| 2014/0351728 A1 * | 11/2014 | Seo | ......................... | G06F 9/451 715/766 |
| 2015/0167339 A1 * | 6/2015 | Wastel | ..................... | E04H 6/22 414/239 |

(Continued)

FOREIGN PATENT DOCUMENTS

| | | |
|---|---|---|
| CN | 107939102 A | 4/2018 |
| CN | 209225332 U | 8/2019 |

(Continued)

OTHER PUBLICATIONS

Espacenet Machine Translation of CN Patent No. 107939102 A.

(Continued)

*Primary Examiner* — Jerry D Robbins
(74) *Attorney, Agent, or Firm* — Plumsea Law Group, LLC

(57) ABSTRACT

A method and system for providing an electric transport device charging and cleaning station is described. In one embodiment, a method for providing an electric transport device to a user includes receiving a request from a user for an electric transport device. The method also includes preparing the electric transport device for deployment, including cleaning and/or charging the electric transport device. The method further includes deploying the prepared electric transport device to the user.

20 Claims, 9 Drawing Sheets

(56) References Cited

U.S. PATENT DOCUMENTS

| | | | |
|---|---|---|---|
| 2016/0375784 A1* | 12/2016 | Takatsu | H02J 50/80 |
| | | | 320/108 |
| 2018/0118043 A1* | 5/2018 | Lee | B60L 53/36 |
| 2019/0054832 A1* | 2/2019 | Lin | H02J 7/0013 |
| 2019/0176769 A1* | 6/2019 | Strasdat | B60S 1/64 |
| 2019/0255963 A1 | 8/2019 | Goei | |
| 2019/0263281 A1* | 8/2019 | Wang | B60L 53/31 |
| 2020/0031413 A1* | 1/2020 | Chen | G07F 9/002 |
| 2020/0058065 A1* | 2/2020 | VanderZanden | G06Q 30/0645 |

FOREIGN PATENT DOCUMENTS

| | | |
|---|---|---|
| CN | 209228152 U | 8/2019 |
| CN | 209244345 U | 8/2019 |
| EP | 3473532 A1 | 4/2019 |
| KR | 20120069859 A | 6/2012 |
| TW | M443978 U | 12/2012 |
| TW | M511657 U | 11/2015 |
| WO | 201991674 A1 | 5/2019 |

OTHER PUBLICATIONS

Espacenet Machine Translation of CN Patent No. 209225332 U.
Espacenet Machine Translation of CN Patent No. 209228152 U.
Espacenet Machine Translation of CN Patent No. 209244345 U.
Espacenet Machine Translation of EP Patent No. 3473532 A1.
Espacenet Machine Translation of the Abstract of the KR Published Patent App No. 20120069859 A.
Espacenet Machine Translation of WO Published Patent App No. 2019091674 A1.

* cited by examiner

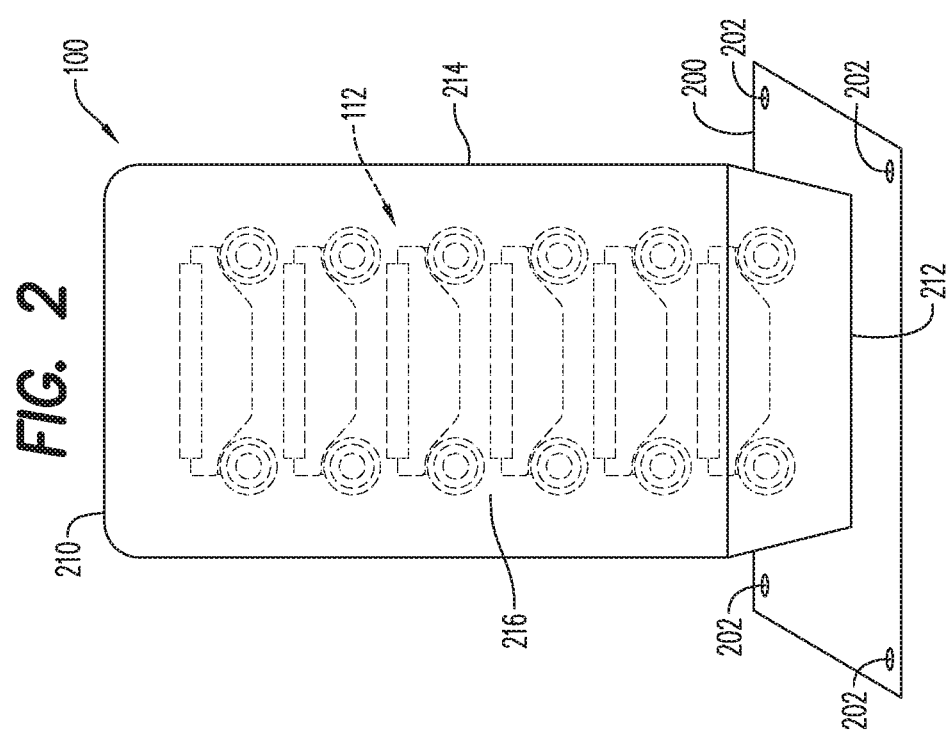

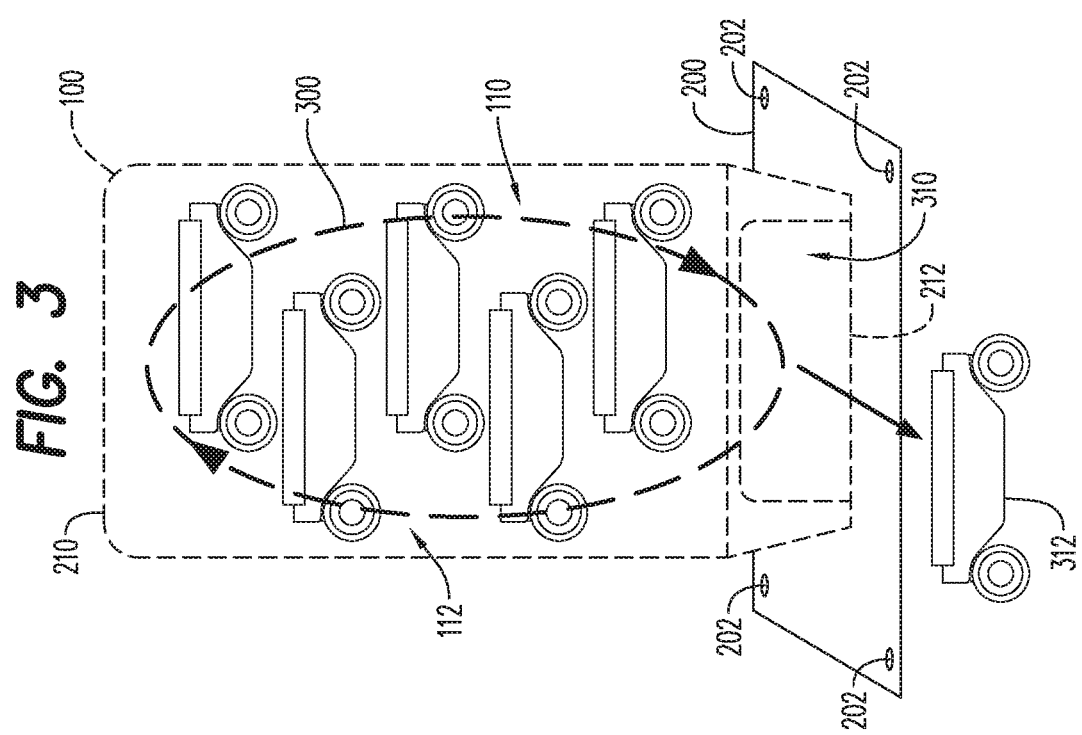

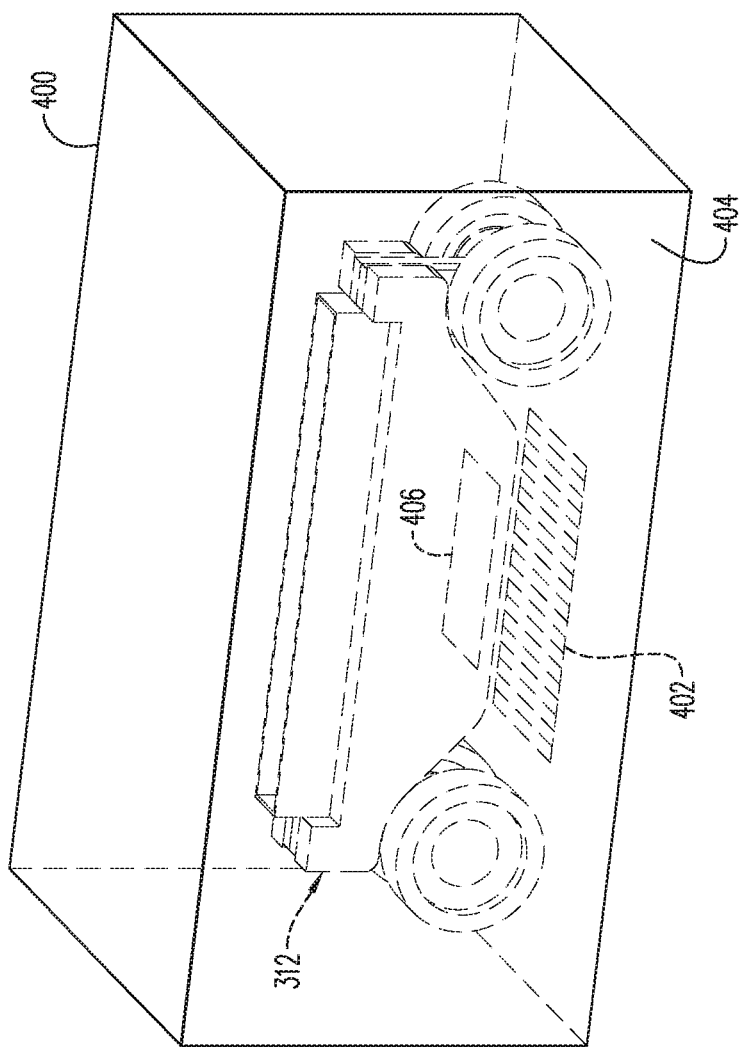

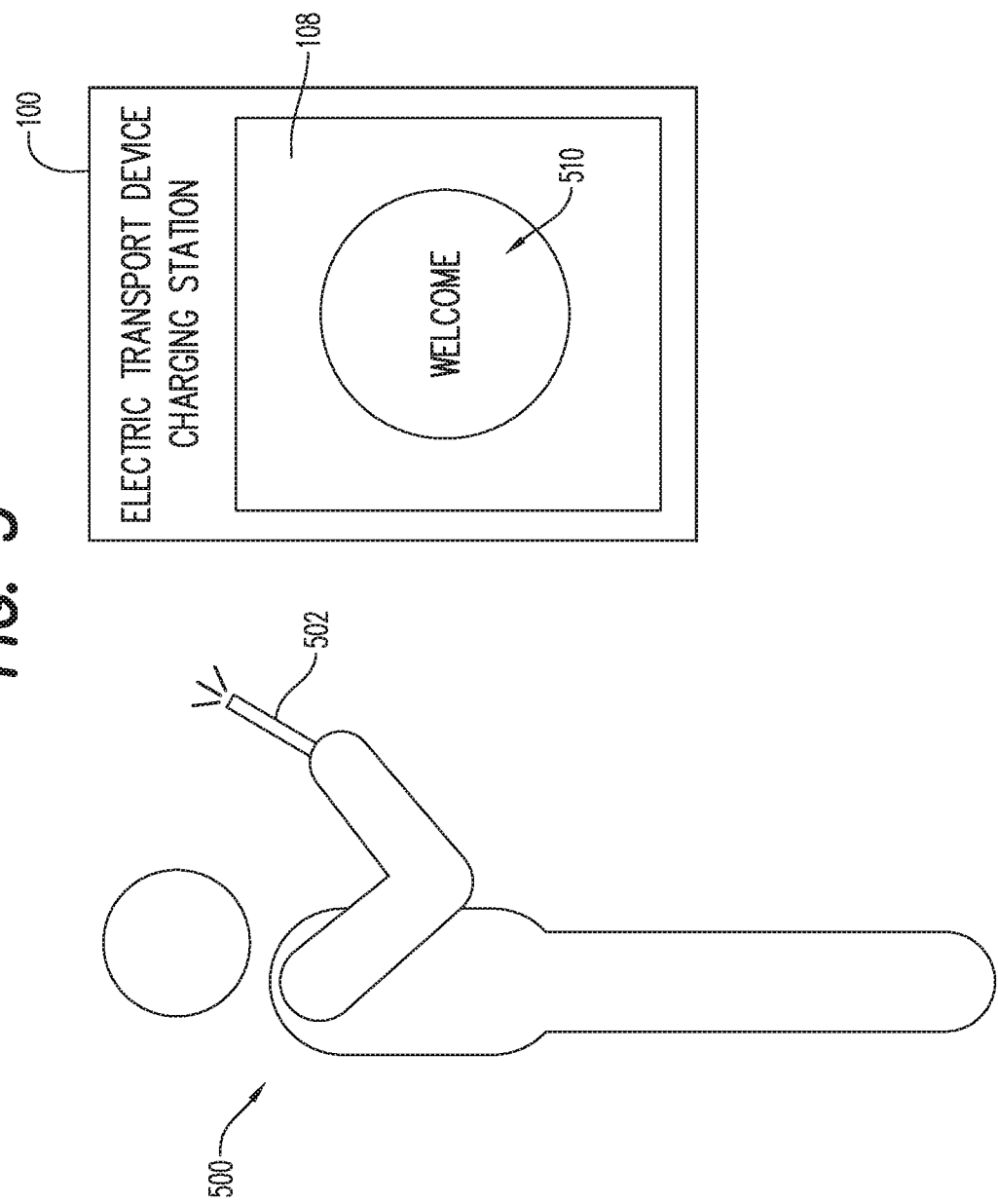

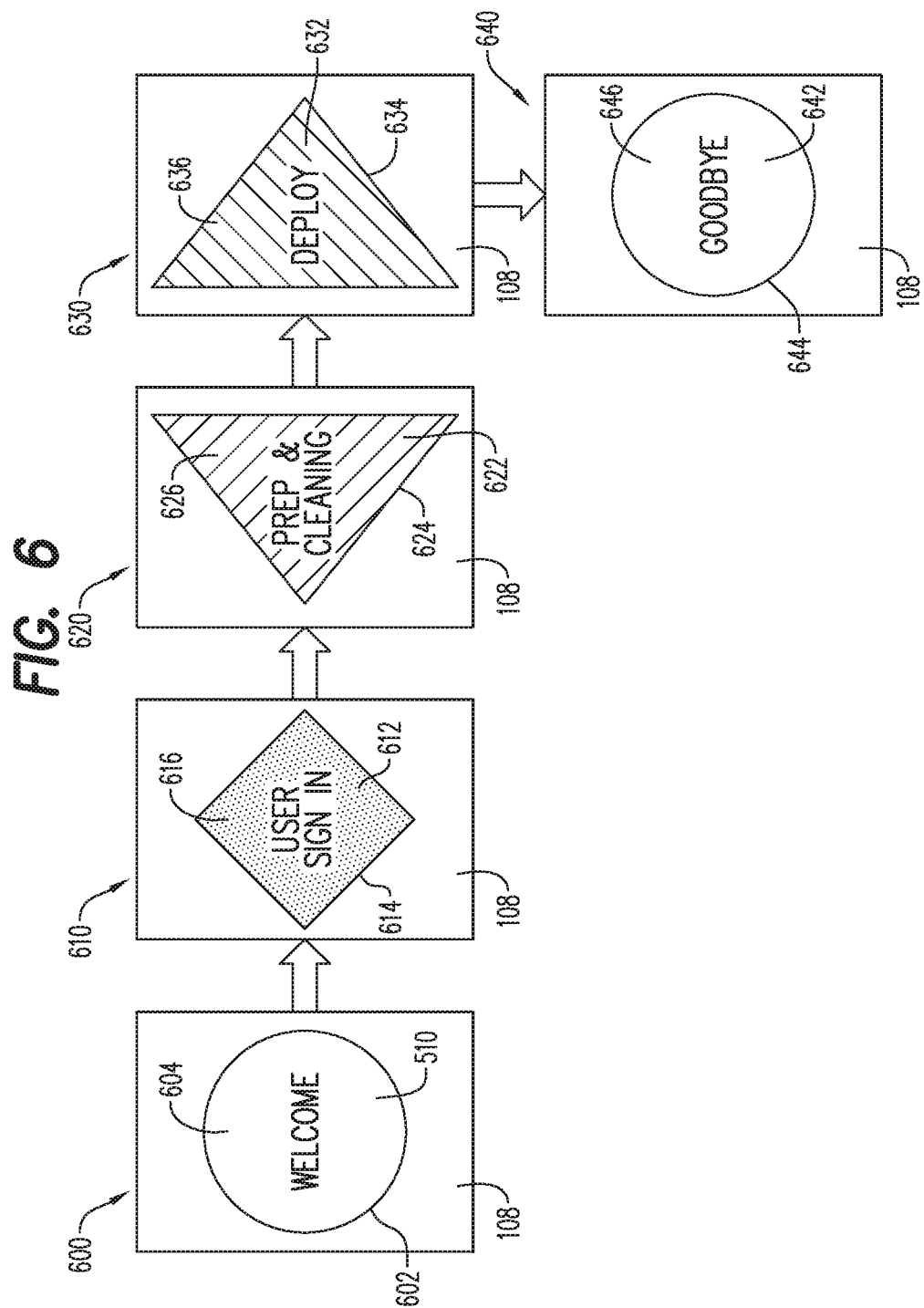

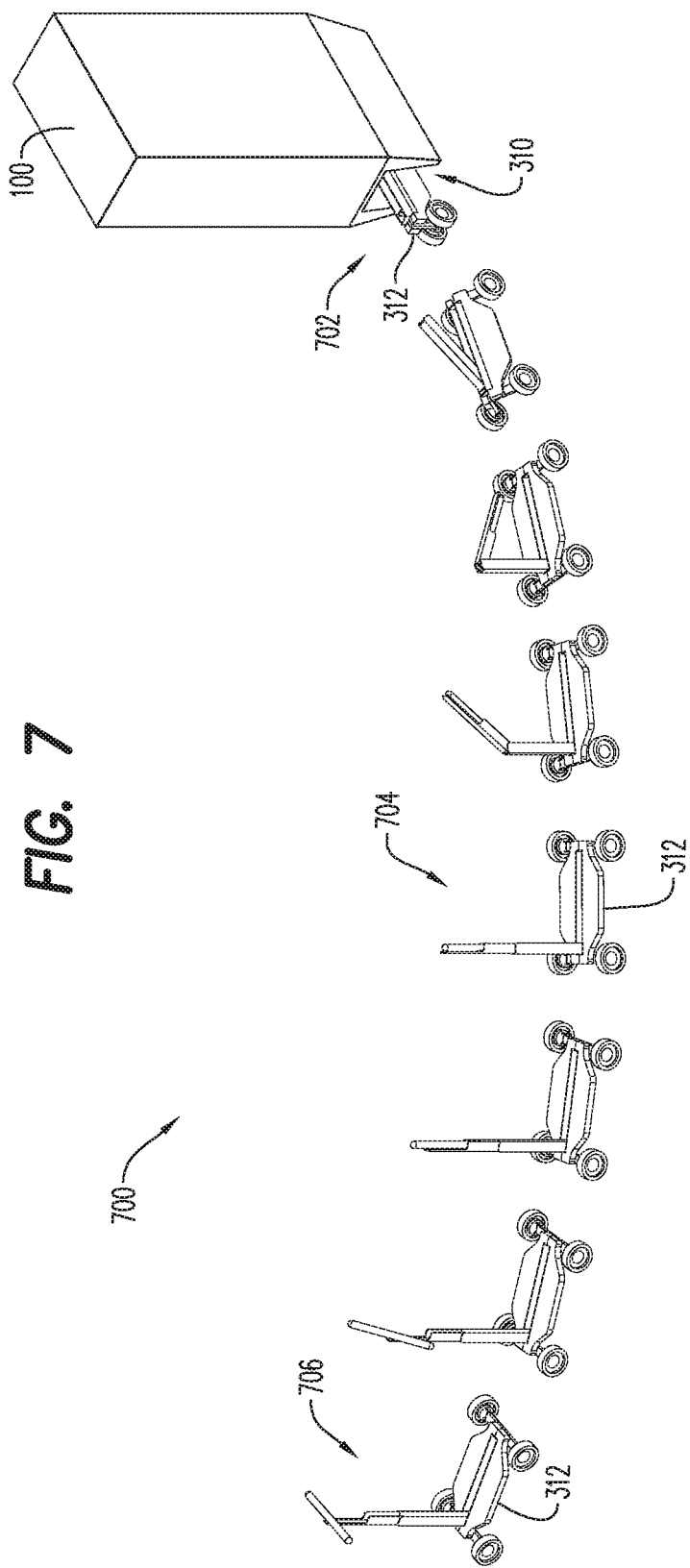

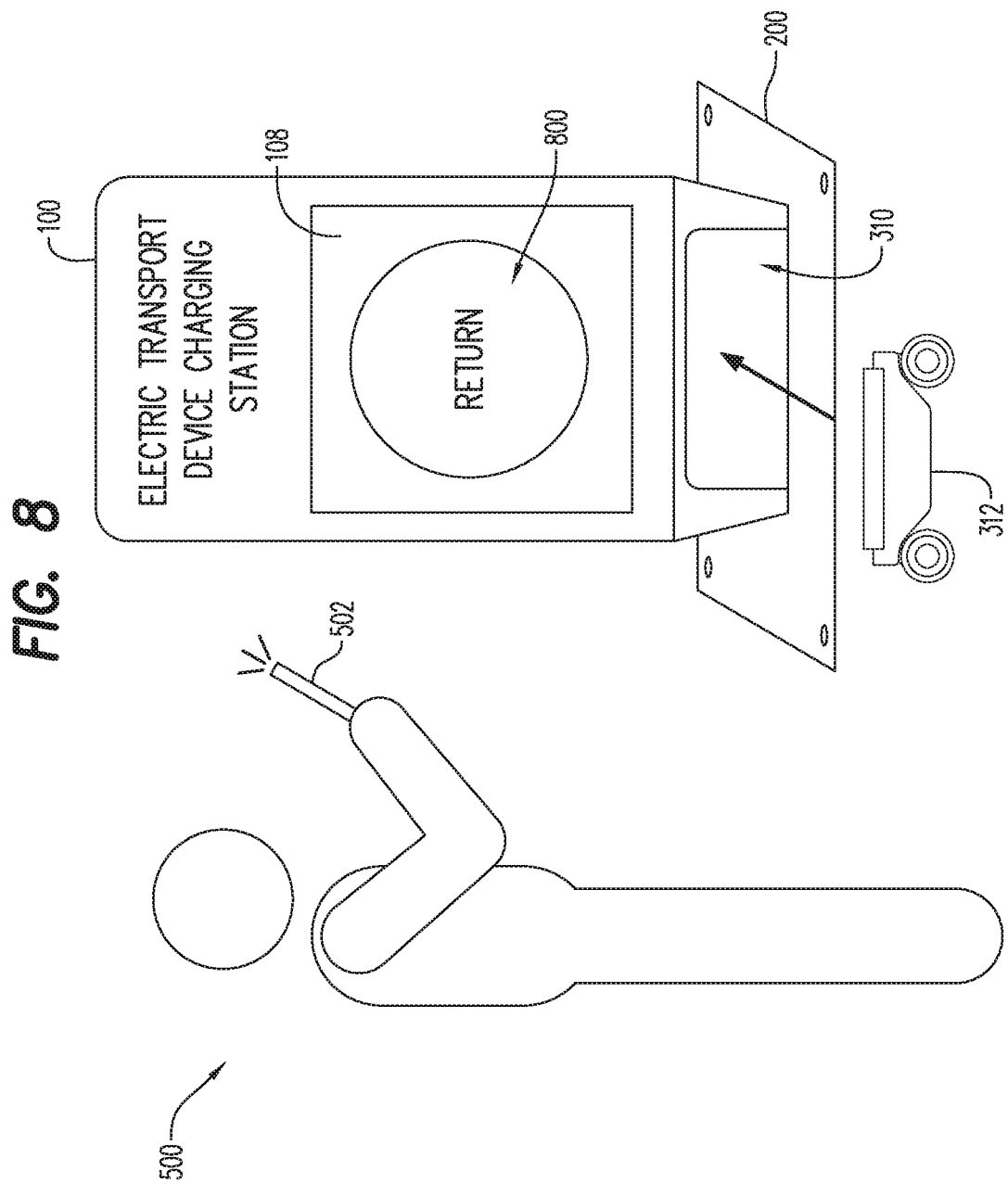

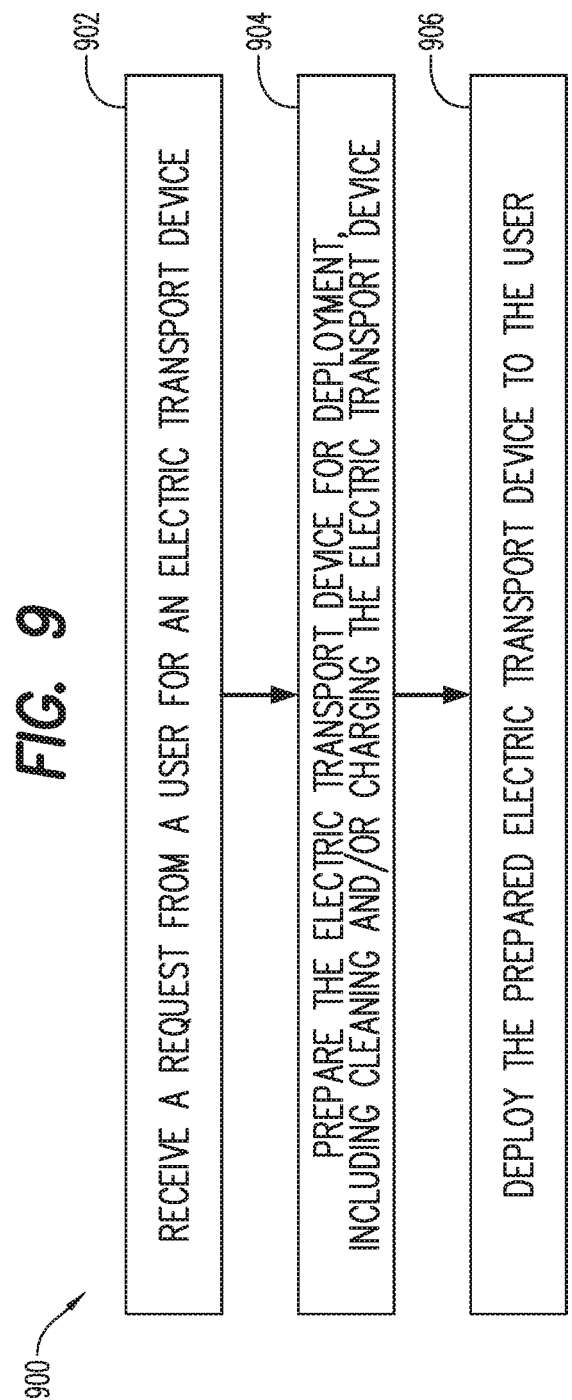

ELECTRIC TRANSPORT DEVICE CHARGING AND CLEANING STATION

BACKGROUND

The embodiments relate generally to vehicles, and in particular to a system and method for providing an electric transport device charging and cleaning station.

With rising prices of gasoline and automobiles, many people may turn to other more cost efficient modes of transportation such as, for example, mopeds, bicycles, scooters and, more recently, electric personal transport devices such as stand-up electric scooters or kick scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network.

Unfortunately, many of these electric scooters and other transport devices are left behind by their users at random places, including on sidewalks, roads, and other locations that are inconvenient for pedestrians and other people. In addition, it may be difficult for users to easily locate an available device and for the devices to be easily recharged and cleaned before their next use. As a result, many jurisdictions have begun to pass local laws and regulations to ban or restrict placement of these personal transport devices due to their disorganized and unsightly presence on community streets and sidewalks.

Accordingly, there is a need in the art for an improved system and method for providing an electric transport device charging and cleaning station.

SUMMARY

In one aspect, the disclosure provides a method for providing an electric transport device to a user. The method includes receiving a request from a user for an electric transport device. The method also includes preparing the electric transport device for deployment, including cleaning and/or charging the electric transport device. The method further includes deploying the prepared electric transport device to the user.

In another aspect, a method of providing an electric transport device to a user is provided. The method includes interacting with a user to receive a request for an electric transport device. The method also includes preparing a selected electric transport device from a plurality of electric transport devices stored inside an electric transport device charging and cleaning station, wherein preparing the selected electric transport device includes charging and/or cleaning the selected electric transport device. The method further includes deploying the selected electric transport device from an access panel located at a bottom of the electric transport device charging and cleaning station.

In another aspect, an electric transport device charging and cleaning station is provided. The electric transport device charging and cleaning station includes at least one processor, a user interface in communication with the at least one processor, and a deployment mechanism holding a plurality of electric transport devices. The electric transport device charging and cleaning station also includes a cleaning mechanism and a charger mechanism.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 2 is a schematic view of an example embodiment of an electric transport device charging and cleaning station installed at a location;

FIG. 3 is a schematic view of an example embodiment of a deployment mechanism inside an electric transport device charging and cleaning station;

FIG. 4 is a representative view of an example embodiment of a carriage for the deployment mechanism of the electric transport device charging and cleaning station;

FIG. 5 is a schematic view of an example embodiment of a user interacting with an electric transport device charging and cleaning station;

FIG. 6 is a representative view of a user interface of an electric transport device charging and cleaning station;

FIG. 7 is a representative view of an example embodiment of an electric platform being deployed from an electric transport device charging and cleaning station;

FIG. 8 is a schematic view of an example embodiment of a user returning an electric platform to an electric transport device charging and cleaning station; and FIG. 9 is a flowchart of a method for providing a charged and cleaned electric transport device to users according to an example embodiment.

DETAILED DESCRIPTION

Figure 1:
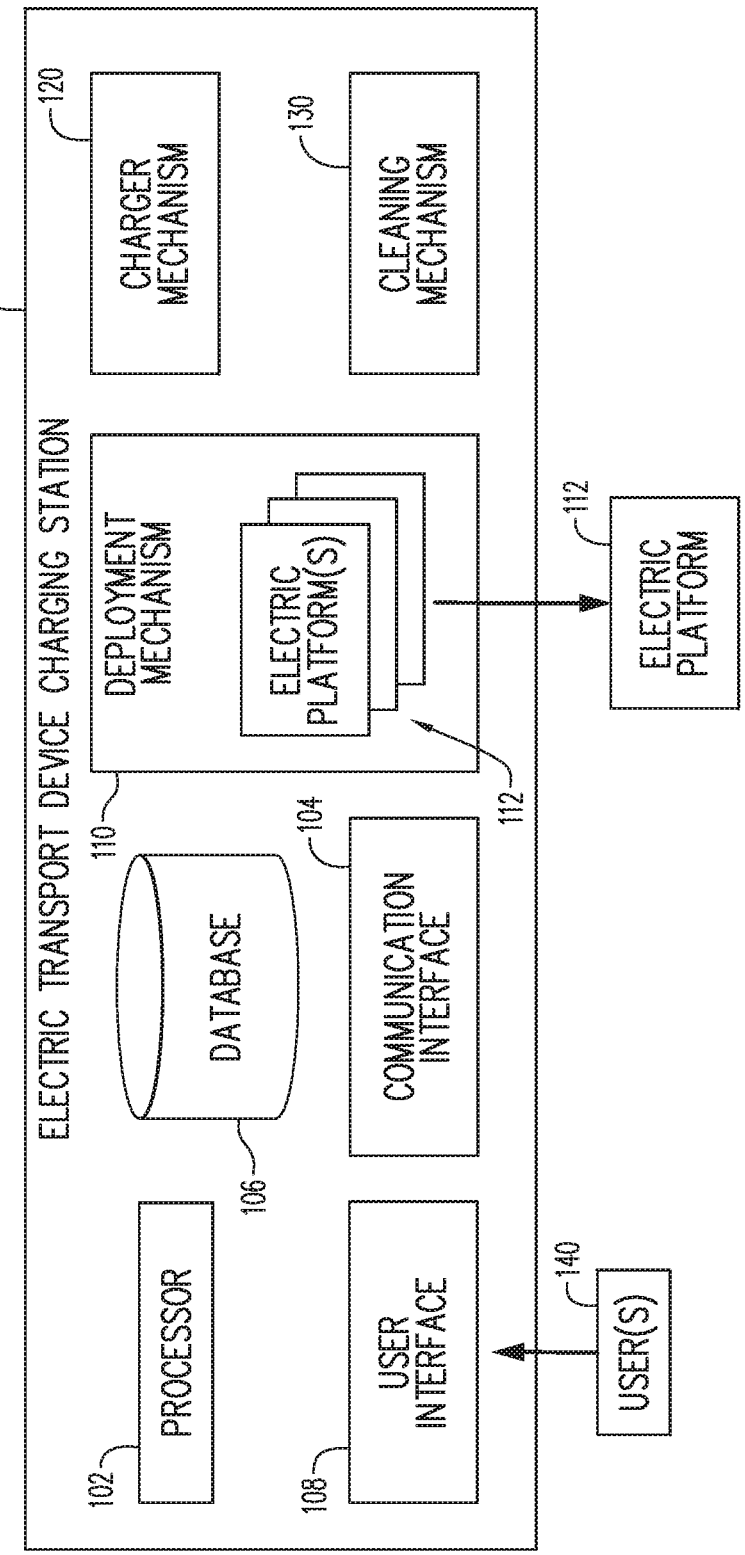
FIG. 1 is a block diagram of an example embodiment of an electric transport device charging and cleaning station.

Methods and systems for providing an electric transport device charging and cleaning station are described herein. The techniques of the present embodiments may be used to provide a convenient storage and charging station for small electric transportation devices so that cleaned and fully-charged devices that are ready for use may be dispensed to users.

The example embodiments are described herein with reference to an electric transport device in the form of an electric scooter. As used herein, an electric scooter is a term used mainly to describe a stand-up kick scooter that is electrically powered. For example, this is a type of personal transport device that is gaining ridership in many locations. The principles of the example embodiments described herein may be applied to electric scooters or other types of electric transport devices, such as bicycles, unicycles, mopeds, skateboards, kickboards, wheelchairs, personal transporters, handcarts, dollies, or the like. Any such electric transport device may also be referred to herein generally as an "electric platform" regardless of its specific form or configuration.

Referring now to FIG. 1, a block diagram of an electric transport device charging and cleaning station 100 (also referred to herein as "station 100") for providing cleaned and charged electric transport devices to users is shown. In an example embodiment, station 100 may be provided at various locations where there is a high density of users of electric transport devices, such as cities and other urban type environments. In an example embodiment, station 100 may include components embodied in hardware, software, or a combination thereof that are configured to implement the techniques described herein for cleaned and charged electric transport devices to users.

In this embodiment, station 100 includes at least a processor 102 that is in communication with a communication interface 104, a database 106, and a user interface 108. In some embodiments, processor 102 may be a dedicated central processing unit (CPU) configured to implement the techniques described herein. In other embodiments, processor 102 may be any computer or computing system, including, but not limited to configurations having multiple processors, one or more servers, and/or a distributed computing system that is located remotely from station 100.

In an example embodiment, communication interface 104 is configured to enable various wireless network communications, such as via code division multiple access (CDMA) and/or global system for mobile communications (GSM) networks, as well as one or more of Bluetooth, WiFi, and/or other wireless communication technologies, including short-range wireless, ultra-wideband, or near-field communication technologies. In this embodiment, communication interface 104 is configured to allow station 100 to communicate with other components, including one or more electric platforms 112 and/or a central monitoring system (not shown). For example, in one embodiment, communication interface 104 may be a wireless transceiver that transmits and/or receives signals (e.g., commands, messages, information, etc.) to and/or from one or more of electric platforms 112, as well as the central monitoring system.

In some embodiments, station 100 may also include database 106 that includes information associated with one or more users and/or electric transport devices or platforms. For example, database 106 may include user or account information, such as usernames and passwords, billing information, etc. Database 106 may also include information associated with the one or more electric transport devices or platforms associated with a particular station, such as those contained or housed within station 100. For example, database 106 may include identification information about the electric platforms 112, such as a serial number or identifier, as well as other information, including, but not limited to state of charge or battery status, usage data (e.g., miles, hours of service, etc.), device type or model, or any other information that may be used by station 100.

In this embodiment, station 100 also includes user interface 108 that is configured to allow a user, for example, one or more users 140, to interact with station 100. In one embodiment, user interface 108 may be a touch screen or display that permits a user to directly interact with station 100. For example, in one embodiment, a touch screen or display may be integrated into an outer housing of station 100 so that a user may select options and dispense an electric transport device or platform from station 100. In other embodiments, user interface 108 may be configured to interact with a user through a mobile device, such as a smart phone or tablet, using short-range communication technologies, for example, Bluetooth®.

In an example embodiment, charging and cleaning station 100 includes a deployment mechanism 110 that is configured to hold, dispense, and/or receive one or more of electric platforms 112. For example, deployment mechanism 110 may be a carousel or conveyor belt feed that individually holds each electric platform and moves internally within station 100 to rotate or rearrange electric platforms inside station 100. In an example embodiment, deployment mechanism 110 may have a first-in, first-out arrangement so that newly returned electric platforms are placed at the back of the queue for dispensing and previously returned electric platforms are dispensed in the order in which they are received starting from the oldest. For example, deployment mechanism 110 may rotate in an approximately clockwise or counter-clockwise direction. With this arrangement, a fully-charged and cleaned electric platform is ready to be dispensed to a user.

In an exemplary embodiment, the electric transport device or platform (e.g., electric platforms 112) may include a dock or other apparatus for receiving a mobile device, such as a smart phone or other type of portable computing device. With an application installed on the mobile device, the mobile device may function as a display screen for the electric transport device or platform and provides a communication interface to an onboard controller or processor of the electric transport device or platform (if present), as well as allowing communication with communication interface 104 and/or user interface 108 of station 100.

As described above, communication between the mobile device and the onboard controller or processor, as well as with communication interface 104 and/or user interface 108, may be accomplished by a variety of ways such as Bluetooth® or other types of short-range wireless or near-field communication protocols. The display screen of the mobile device may provide information to the user of the electric transport device or platform regarding, for example, battery life, status of lighting units, distance traveled, speed, navigation information, hazard information and roadway infrastructure signals and readings. The application on the mobile device may also monitor and/or control some of the operating systems of the electric transport device or platform. For example, information associated with braking, speed, location, heading, turn status, etc. may be monitored and/or controlled via the application on the mobile device.

In some embodiments, charging and cleaning station 100 includes components configured to charge and clean electric platforms 112. In this embodiment, station 100 includes at least a charger mechanism 120 that is configured to provide electric power to electric platforms 112 to recharge their batteries in between uses. For example, charger mechanism 120 may be any suitable electric battery charging mechanism, including contact-type chargers and/or contactless or induction-type chargers. With this arrangement, station 100 is configured to charge electric platforms 112 while they are retained within station 100 so that they are fully-charged and ready for a new user (i.e., one or more of users 140).

In this embodiment, station 100 also includes at least a cleaning mechanism 130 that is configured to clean electric platforms 112 in between uses. For example, cleaning mechanism 130 may include one or more of a steam-cleaning apparatus which uses high temperature steam to clean or sanitize electric platforms 112 and/or an ultraviolet (UV) cleaning apparatus which uses ultraviolet frequency radiation or light to clean or sanitize electric platforms 112. Cleaning mechanism 130 may also include other types or forms of cleaning apparatuses that are configured to clean or sanitize, such as by using electrostatic disinfection, air circulation and vacuum, heat and/or chemicals or other cleaning agents, and may include a drying cycle if necessary. With this arrangement, station 100 is configured to clean electric platforms 112 while they are retained within station 100 so that they are cleaned and ready for a new user (i.e., one or more of users 140). The cleaning mechanism may operate one or more cleaning cycles in which all surfaces of the platforms are cleaned, including the handles and other areas of user contact.

In some embodiments, station 100 may include other components not shown in FIG. 1 to facilitate providing cleaned and charged electric transport devices to users according to the example embodiments described herein.

Referring now to FIG. 2, a schematic view of an example embodiment of electric transport device charging and cleaning station 100 is shown installed at a location. In an example embodiment, station 100 may be mounted to a base plate 200. Base plate 200 provides a stable and level platform for installing station 100 at various locations, such as on a sidewalk or street or other locations. In this embodiment, base plate 200 is fastened to a ground surface using a plurality of fasteners 202, for example, bolts or screws, that secure base plate 200 and station 100 to the location where it is installed (i.e., to the sidewalk, street, etc.). With this arrangement, station 100 may be secured from being moved, tipped over, stolen, vandalized, etc.

In addition, in some embodiments, station 100 may include a releasable attachment mechanism (not shown) that connects and disconnects station 100 with base plate 200 to easily move station 100 between different base plates installed at various locations. For example, a charging and cleaning station may be moved to different locations based on the time of day to account for commuter cycles or shifts. In another example, multiple base plates may be permanently or temporarily installed at different locations within an environment and one or more charging and cleaning stations (i.e., substantially similar to station 100) may be later attached at selected locations where there is a base plate installed based on user demand and/or for special occasions where additional electric platforms may be needed.

In some embodiments, base plate 200 may also facilitate connecting station 100 to one or more of a power source and/or a water source, such as provided from a municipal utility or other service provider. For example, the power source may be configured to supply electrical power to station 100, as well as to charger mechanism 120 and/or cleaning mechanism 130. Similarly, the water source may be configured to supply water to cleaning mechanism 130, for example, in embodiments that include a steam cleaning apparatus. In other embodiments, one or more of the power source and/or the water source may be self-contained within station 100. For example, station 100 may be provided with solar panels or other electrical generating mechanisms to provide electrical power to station 100, as well as to charger mechanism 120 and/or cleaning mechanism 130. Station 100 may also be provided with a rain water reservoir or other water collecting mechanism to provide a water source to cleaning mechanism 130.

In one embodiment, charging and cleaning station 100 may have a generally rectangular shape. As shown in FIG. 2, station 100 has a top end 210 that is located spaced apart from an opposite bottom end 212. In an example embodiment, station 100 may be attached to base plate 200 at bottom end 212. Bottom end 212 of station 100 may also be provided with a door or access panel (shown in FIG. 3) that allows electric platforms 112 to be dispensed from inside station 100 and provided to a user.

In some embodiments, station 100 includes an outer housing 214 that surrounds an interior of station 100, including deployment mechanism 110 holding electric platforms 112 within station 100. In an example embodiment, outer housing 214 may be transparent or translucent such that components within the interior of station 100 are visible to a user, including, for example, deployment mechanism 110 and/or one or more electric platforms 112. With this arrangement, a user approaching station 100 may easily see and verify that station 100 has electric platforms 112 available for use. In addition, in some embodiments, outer housing 214 may include an integrated screen or display 216. Integrated screen or display 216 may be part of user interface 108, described above, and may permit a user to interact with station 100 to obtain one of electric platforms 112. For example, integrated screen or display 216 may be a touch screen or display that permits the user to interact directly with station 100 to select options and dispense an electric transport device or platform from station 100.

FIG. 3 is a schematic view of an example embodiment of deployment mechanism 110 inside charging and cleaning station 100. As described above, station 100 includes deployment mechanism 110 that is configured to hold one or more electric platforms 112 and rotate or rearrange them inside station 100 to individually deploy and/or receive an electric platform. For example, as shown in FIG. 3, deployment mechanism 110 includes a carousel or conveyor belt 300 that is configured to rotate in a clockwise direction to move each electric platform into place to be deployed and, alternatively, to be received when a user returns an electric platform.

In an example embodiment, carousel or belt 300 is oriented substantially vertically within station 100 so that each of the one or more electric platforms 112 are arranged generally horizontally within station 100 between top end 210 and bottom end 212. In this embodiment, station 100 includes a door or access panel 310 located at bottom end 212 of station 100 that allows electric platforms 112 to be dispensed from inside station 100 and provided to a user. For example, as shown in FIG. 3, a first electric platform 312 is dispensed from deployment mechanism 110 inside station 100 through access panel 310 at bottom end 212 of station 100 where it may be used by a user. Additionally, access panel 310 may also be configured to receive an electric platform when returned by a user to station 100.

FIG. 4 is a representative view of an example embodiment of a carriage 400 for use with deployment mechanism 110 of station 100. In some embodiments, electric platforms 112 inside station 100 may be connected or attached to deployment mechanism 110, for example, carousel or conveyor belt 300, using carriage 400. Carriage 400 may be an open-sided box or other container that is sized and dimensioned to hold an electric platform (e.g., an individual one of electric platforms 112) within its interior. For example, the dimensions of carriage 400 may vary depending on the type and/or form of electric transport device or platform contained within station 100. In addition, in some embodiments, carriage 400 may be sized and dimensioned to hold a range of differently sized electric platforms so that a user may return different types of electric transport devices or platforms to station 100.

With this arrangement, when carousel or conveyor belt 300 rotates, each carriage 400 holding a respective individual one of electric platforms 112 moves along with it, thereby moving electric platforms 112 into position within station 100 to be deployed to a user. Similarly, an empty carriage 400 may also be positioned at access panel 310 in order to receive an electric platform when returned by a user to station 100.

In an example embodiment, carriage 400 may be configured with a charging port 402 connected to and associated with charger mechanism 120 of station 100. Charging port 402 in each carriage 400 is configured to charge a respective electric platform 112 held within carriage 400. As described above, in some embodiments, charging port 402 may be a contact-type charger or a contactless, induction-type charger. As shown in FIG. 4, charging port 402 is an induction-type charger that is disposed along a bottom surface 404 of the interior of carriage 400. With this arrangement, charging port 402 is aligned with a battery 406 of the electric transport device or platform, for example, first electric platform 312 as shown in this embodiment.

In some embodiments, carriage 400 is provided with open sides along one or more directions so that the electric platform held within carriage 400 is accessible by cleaning mechanism 130 of station 100. For example, as shown in FIG. 4, carriage 400 has a generally rectangular shape with open sides along each of a top, sides, and ends so that first electric platform 312 may be cleaned by cleaning mechanism 130, such as by exposing first electric platform 312 to UV light and/or steam to clean and sanitize it for other users.

FIG. 5 is a schematic view of an example embodiment of a user interacting with charging and cleaning station 100. In some embodiments, a user 500 may interact with station 100, for example, through user interface 108. In this embodiment, user 500 has a mobile phone 502, which may include an application or app that allows user 500 to reserve an electric platform from station 100 and otherwise interact with station 100. As shown in FIG. 5, when user 500 uses mobile phone 502 to interact with station 100, user interface 108 of station 100 may display a greeting or welcome message 510 to user 500. In other embodiments, user 500 may directly interact with user interface 108, for example, by touching a touch screen or display integrated into the outer housing (e.g., outer housing 214) of station 100. With this arrangement, user 500 may select options and dispense an electric transport device or platform from station 100.

FIG. 6 is a representative view of user interface 108 of charging and cleaning station 100 showing various messages that may be presented to a user. In some embodiments, the various messages and menus displayed on user interface 108 of station 100 may sequence or transition between different shapes and/or colors to provide visual cues to the user to move through the selection of options and menus in order to dispense an electric transport device or platform from station 100. It should be understood that the specific menus, options, and messages shown in FIG. 6, along with their associated colors and/or shapes, are exemplary and other embodiments may include different menus, options, messages and associated colors and/or shapes than those illustrated in FIG. 6.

In this embodiment, during a first interaction 600 between user 500 and user interface 108 of station 100, user 500 is presented with welcome message 510 on user interface 108, as described above in reference to FIG. 5. As shown in FIG. 6, welcome message 510 is associated with a first shape 602, for example, a circle, and a first color 604 displayed in the background of user interface 108. Next, during a second interaction 610 between user 500 and user interface 108, user 500 is presented with a user sign in message 612. User 500 may use mobile device 502 (as shown in FIG. 5) to provide the requested information to station 100 (e.g., user-name, password, etc.) to access a previously-created account. Alternatively, user 500 may sign up or create a new account to use station 100 during second interaction 610. Once created, the user's account may include a profile and various user preferences, such as billing options, preferred locations, type or form of electric transport device or platform, etc.

As shown in this embodiment, user sign in message 612 is associated with a second shape 614, for example, a diamond, that is different from first shape 602. In addition, user sign in message 612 may also be associated with a second color 616 displayed in the background of user interface 108 that is different from first color 604. That is, by transitioning from first shape 602 to second shape 614 and/or from first color 604 to second color 616 between first interaction 600 and second interaction 610, user 500 may be alerted or prompted that the next option or selection is needed.

In this embodiment, during a third interaction 620, user 500 may be presented with a preparation and cleaning message 622. For example, preparation and cleaning message 622 may indicate to user 500 that an electric transport device or platform is being readied by station 100 to be deployed, including moving the electric platform into position (e.g., by rotation of carousel 300 of deployment mechanism 110, described above) and/or cleaning the electric platform (e.g., using cleaning mechanism 130, described above). As shown in FIG. 6, preparation and cleaning message 622 is associated with a third shape 624, for example, a left-facing triangle, that is different from first shape 602 and/or second shape 614. In addition, preparation and cleaning message 622 may also be associated with a third color 626 that is displayed in the background of user interface 108 that is different from first color 604 and/or second color 616.

Next, during a fourth interaction 630, user 500 may be presented with a deploy message 632 shown on user interface 108. For example, deploy message 632 may indicate to user 500 that the electric transport device or platform is ready to be deployed, such as through access panel 310, shown in FIG. 3. As shown in this embodiment, deploy message 632 is associated with a fourth shape 634, for example, a right-facing triangle, that is different from first shape 602, second shape 614, and/or third shape 624. In addition, deploy message 632 may also be associated with a fourth color 636 that is displayed in the background of user interface 108 that is different from first color 604, second color 616, and/or third color 626.

Finally, during a fifth interaction 640, user 500 may be presented with a goodbye message 642 on user interface 108 of station 100. Goodbye message 642 may indicate to user 500 that the interactions between user 500 and station 100 are complete and user 500 may now take the deployed electric transport device or platform away from station 100. As shown in FIG. 6, goodbye message 642 is associated with a fifth shape 644, for example, a circle, and may also be associated with a fifth color 646. In some embodiments, fifth shape 644 may be different from any of first shape 602, second shape 614, third shape 624, and/or fourth shape 634 and fifth color 646 may be different from any of first color 604, second color 616, third color 626, and/or fourth color 636. In one embodiment, fifth shape 644 may be the same as first shape 602 (e.g., a circle) and/or fifth color 646 may be the same as first color 604, so that the same shape and/or color is used to begin and end the interactions between user 500 and station 100, thereby visually indicating to user 500 that the interactions are complete.

With this arrangement shown in FIG. 6, by changing shapes and/or colors of the messages shown on user interface 108 of station 100 during the various interactions between user 500 and station 100, a user may be provided with visual cues to assist the user to move through the selection of options and menus in order to dispense an electric transport device or platform from station 100.

FIG. 7 is a representative view of an example embodiment of an electric platform being deployed from electric transport device charging and cleaning station 100. In some embodiments, an electric transport device or platform may be configured such that it is provided in a folded position when disposed inside station 100 and is configured to be unfolded into an unfolded position when deployed outside of station 100. In an example embodiment, an unfolding process 700 may be performed by a user to move or transition an electric transport device or platform from the folded positon to the unfolded position.

In this embodiment, first electric platform 312 is shown as a representative electric transport device or platform that is dispensed from station 100. While held inside station 100 and as deployed through access panel 310 of station 100, first electric platform 312 may be arranged in a folded position 702. Folded position 702 is a compact arrangement with one or more components of first electric platform 312 folded or positioned in a way such that first electric platform 312 fits inside carriage 400 of deployment mechanism 110, described above. For example, in this embodiment, first electric platform 312 is in the form of an electric scooter and folded position 702 includes positioning components such as handlebars, deck, extension pole/neck, etc. into a compact, folded position.

Upon being deployed from station 100, for example, through access panel 310, first electric platform 312 may be moved from folded position 702 into one or more intermediate positions. For example, as shown in FIG. 7, first electric platform 312 may be arranged into an intermediate position 704 that includes partially deploying the various components in a way to be ready to use by the user. In this embodiment, intermediate position 704 may include folding down the deck of first electric platform 312 so that it is ready to receive a foot or feet of the user and beginning to extend and unfold the extension pole/neck that supports the handlebars.

Finally, unfolding process 700 may include arranging first unfolding process 700 into an unfolded position 706. Unfolded position 706 includes fully extending and unfolding all of the components of first electric platform 312 so that it is ready for use by a user. For example, in this embodiment, unfolded position 706 includes unfolding and extending the handlebars and locking into place other components, such as the deck and/or the extension pole/neck. Once first electric platform 312 is arranged into unfolded position 706, it is ready to be used by the user.

It should be understood that unfolding process 700 shown in FIG. 7 is specific to the type or form of electric transport device or platform illustrated (i.e., an electric scooter). Other types or forms of electric transport devices or platforms may be similarly arranged between an initial, compact folded position as held or stored inside station 100 to a final, deployed unfolded position as ready to be used. In addition, unfolding process 700 may include any number of intermediate positions as needed to transition the electric transport device or platform between the folded and unfolded positions.

FIG. 8 is a schematic view of an example embodiment of a user returning an electric platform to electric transport device charging and cleaning station 100. In some embodiments, each station 100 may be configured to accept or receive returns of electric transport devices or platforms when a user has finished using it. In this embodiment, user 500 is returning first electric platform 312 to station 100. In an example embodiment, user 500 may interact with user interface 108 of station 100 using an application on mobile device 502, as described above, to initiate the return of first electric platform 312 to station 100. In other embodiments, user 500 may directly interact with user interface 108 through a touch screen or display integrated into the outer housing (e.g., outer housing 214, described above) of station 100.

As shown in FIG. 8, user 500 interacts with user interface 108 of station 100 to being the process of returning first electric platform 312. For example, user interface 108 displays a return message 800 to indicate to user 500 that station 100 is ready to accept the return of first electric platform 312. In some cases, station 100 may rotate deployment mechanism 110 disposed inside station 100 so that an empty carriage (e.g., carriage 400, described above) is positioned at access panel 310 at the bottom of station 100 so that first electric platform 312 may be received and accepted into station 100. When access panel 310 opens, user 500 may place first electric platform 312 inside to return it to station 100. In some embodiments, user 500 may arrange first electric platform 312 into a folded position (e.g., folded positon 702, shown in FIG. 7) so that first electric platform 312 fits inside access panel 310 and/or carriage 400 of station 100.

Once first electric platform 312 has been received inside station 100, user 500 may receive another message via user interface 108 to confirm that it has been accepted and the interaction has been completed. As described above, the returned first electric platform 312 may be charged and/or cleaned using charger mechanism 120 and/or cleaning mechanism 130 to ready the electric platform for use by another user. With this arrangement, electric transport device charging and cleaning station 100 provides cleaned and charged electric transport devices to users.

FIG. 9 is a flowchart of a method 900 for providing a charged and cleaned electric transport device to users according to an example embodiment. In some embodiments, method 900 may be implemented by an electric transport device charging and cleaning station, for example, station 100, described above. In an example embodiment, method 900 may begin with an operation 902. At operation 902, a request is received from a user for an electric transport device. For example, at operation 902, user 500 may interact with station 100 to request an electric transport device or platform, such as first electric platform 312, described above.

Next, at an operation 904, method 900 includes preparing the electric transport device for deployment, including cleaning and/or charging the electric transport device within the electric transport device charging and cleaning station. For example, operation 904 may include using charger mechanism 120 and/or cleaning mechanism 130 within station 100 to prepare an electric transport device or platform for deployment to a user, such as user 500.

Method 900 also includes an operation 906. At operation 906, upon completion of the preparation of the electric transport device at operation 904, the prepared electric transport device (i.e., that has been charged and/or cleaned) is deployed to the user. For example, operation 906 may include using deployment mechanism 110 inside station 100 to move the prepared electric transport device or platform into position and deploying the prepared electric transport device or platform from access panel 310 at the bottom of station 100, as described above. In addition, in some embodiments, the prepared electric transport device or platform may be deployed from station 100 in a folded position (e.g., folded position 702) and the user may arrange or transition the electric transport device or platform from the folded position to an unfolded position (e.g., unfolded position 706) prior to using the deployed electric transport device or platform.

Additionally, a similar method may be implemented in the opposite order to allow a user to return the electric transport device or platform to a charging and cleaning station, as described above in reference to FIG. 8.

While the electric transport device or platform relative to the exemplary embodiment here is illustrated and described as an electric scooter, any type of small, personal electric transport vehicle could be employed, such as an electric skateboard, one- and two-wheeled self-balancing boards, electric bicycles or e-bikes, electric-assisted mopeds, small electric-powered mobility transporters, etc.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A method for providing an electric transport device to a user, the method comprising:
   providing an electric transport device charging and cleaning station at location, the electric transport device charging and cleaning station containing a plurality of electric transport devices within an interior of the electric transport device charging and cleaning station;
   connecting the electric transport device charging and cleaning station to a power source for supplying electrical power to the electric transport device charging and cleaning station;
   connecting the electric transport device charging and cleaning station to a water source for supplying water to a cleaning mechanism inside the electric transport device charging and cleaning station;
   receiving, at the electric transport device charging and cleaning station, a request from a user for an electric transport device of the plurality of electric transport devices contained within the interior of the electric transport device charging and cleaning station;
   preparing the electric transport device for deployment from within the electric transport device charging and cleaning station,
   wherein preparing the electric transport device for deployment further includes:
      charging the electric transport device using a charging mechanism of the electric transport device charging and cleaning station; and
      cleaning the electric transport device using the cleaning mechanism of the electric transport device charging and cleaning station, wherein cleaning the electric transport device comprises using the water from the water source to steam clean the electric transport device; and
   after the electric transport device has been charged and cleaned using steam from the cleaning mechanism inside the electric transport device charging and cleaning station, deploying the prepared electric transport device to the user from the electric transport device charging and cleaning station.

2. The method according to claim 1, wherein receiving the request includes interacting with a user interface of the electric transport device charging and cleaning station.

3. The method according to claim 2, wherein interacting with the user interface includes using an application on a mobile device.

4. The method according to claim 2, wherein interacting with the user interface includes using a touch screen display integrated into the electric transport device charging and cleaning station.

5. The method according to claim 4, wherein the touch screen display is part of an outer housing of the electric transport device charging and cleaning station.

6. The method according to claim 1, wherein deploying the prepared electric transport device to the user includes moving the electric transport device into position using a deployment mechanism inside the electric transport device charging and cleaning station.

7. The method according to claim 6, wherein deploying the prepared electric transport device to the user further includes dispensing the electric transport device from an access panel of the electric transport device charging and cleaning station.

8. The method according to claim 1, further comprising returning the electric transport device to an electric transport device charging and cleaning station.

9. A method of providing an electric transport device to a user, the method comprising:
   providing an electric transport device charging and cleaning station at location, the electric transport device charging and cleaning station containing a plurality of electric transport devices within an interior of the electric transport device charging and cleaning station;
   connecting the electric transport device charging and cleaning station to a power source for supplying electrical power to the electric transport device charging and cleaning station;
   connecting the electric transport device charging and cleaning station to a water source for supplying water to a cleaning mechanism inside the electric transport device charging and cleaning station;
   interacting with a user to receive a request for an electric transport device of the plurality of electric transport devices contained within the interior of the electric transport device charging and cleaning station;
   preparing a selected electric transport device from the plurality of electric transport devices stored inside the electric transport device charging and cleaning station for deployment from within the electric transport device charging and cleaning station,
   wherein preparing the selected electric transport device for deployment further includes:
      charging the selected electric transport device using a charging mechanism of the electric transport device charging and cleaning station; and
      cleaning the selected electric transport device using the cleaning mechanism of the electric transport device charging and cleaning station, wherein cleaning the electric transport device comprises using the water from the water source to steam clean the selected electric transport device; and
   after the selected electric transport device has been charged and cleaned using steam from the cleaning mechanism inside the electric transport device charging and cleaning station, deploying the selected electric transport device from an access panel located at a bottom of the electric transport device charging and cleaning station.

10. The method according to claim 9, wherein the selected electric transport device is deployed from the access panel in a folded position.

11. The method according to claim 10, wherein the electric transport device is configured to be transitioned from the folded position to an unfolded position prior to use by the user.

12. The method according to claim 9, wherein interacting with the user includes interacting with a user interface of the electric transport device charging and cleaning station.

13. The method according to claim 12, wherein interacting with the user interface includes a plurality of interactions between the user and the user interface; and
   wherein each interaction of the plurality of interactions is associated with at least a shape and/or a background color displayed on the user interface that is different for each interaction.

14. The method according to claim 12, wherein interacting with the user interface includes at least one of using an application on a mobile device or using a touch screen display integrated into the electric transport device charging and cleaning station.

15. An electric transport device charging and cleaning station, comprising:
   an outer housing surrounding an interior of the electric transport device charging and cleaning station;
   at least one processor;
   a user interface in communication with the at least one processor;
   a deployment mechanism holding a plurality of electric transport devices, the deployment mechanism disposed inside the outer housing;
   a cleaning mechanism disposed inside the outer housing, the cleaning mechanism configured to use water from a water source connected to the electric transport device charging and cleaning station to steam clean one or more of the plurality of electric transport devices; and
   a charger mechanism disposed inside the outer housing, the charger mechanism configured to use electrical power from a power source connected to the electric transport device charging and cleaning station to charge one or more of the plurality of electric transport devices.

16. The electric transport device charging and cleaning station according to claim 15, wherein the deployment mechanism includes a carousel configured to rotate the plurality of electric transport devices inside the electric transport device charging and cleaning station.

17. The electric transport device charging and cleaning station according to claim 16, further comprising:
   a plurality of carriages attached to the carousel of the deployment mechanism, wherein each carriage is configured to hold a respective one electric transport device of the plurality of electric transport devices.

18. The electric transport device charging and cleaning station according to claim 17, wherein each carriage further includes a charging port connected to the charger mechanism that is configured to charge a battery of the respective electric transport device.

19. The electric transport device charging and cleaning station according to claim 15, wherein the user interface is integrated into the outer housing.

20. The electric transport device charging and cleaning station according to claim 15, further comprising an access panel located at a bottom of the electric transport device charging and cleaning station; and
   wherein the deployment mechanism is configured to move an electric transport device of the plurality of electric transport devices into position at the access panel to deploy the electric transport device to a user.

* * * * *